Jan. 3, 1967 J. F. SMOLA ETAL 3,295,809
TORSION SPRING HINGE MECHANISM
Filed June 11, 1963 2 Sheets-Sheet 1
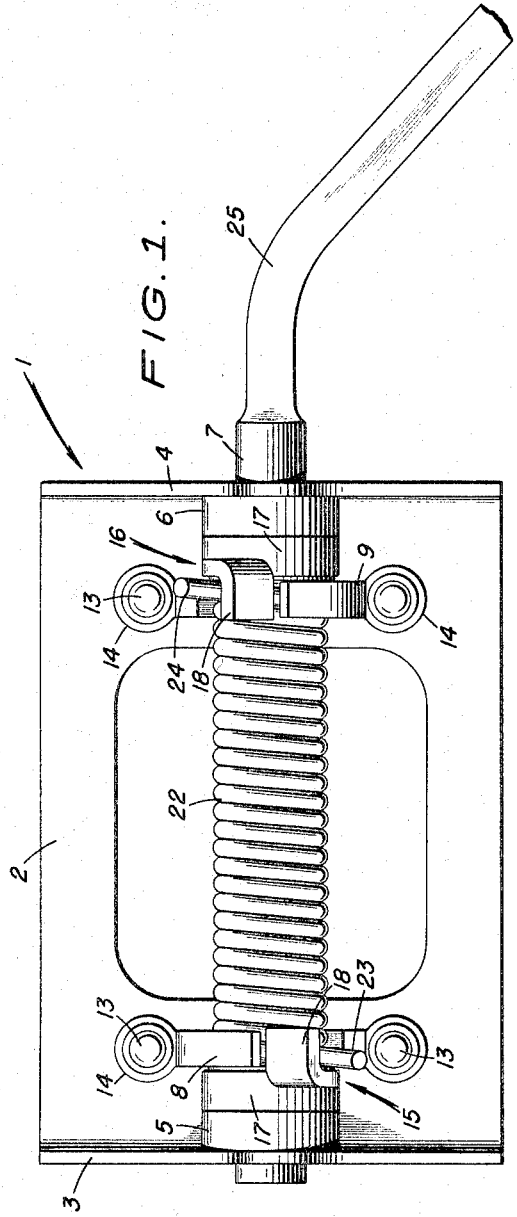
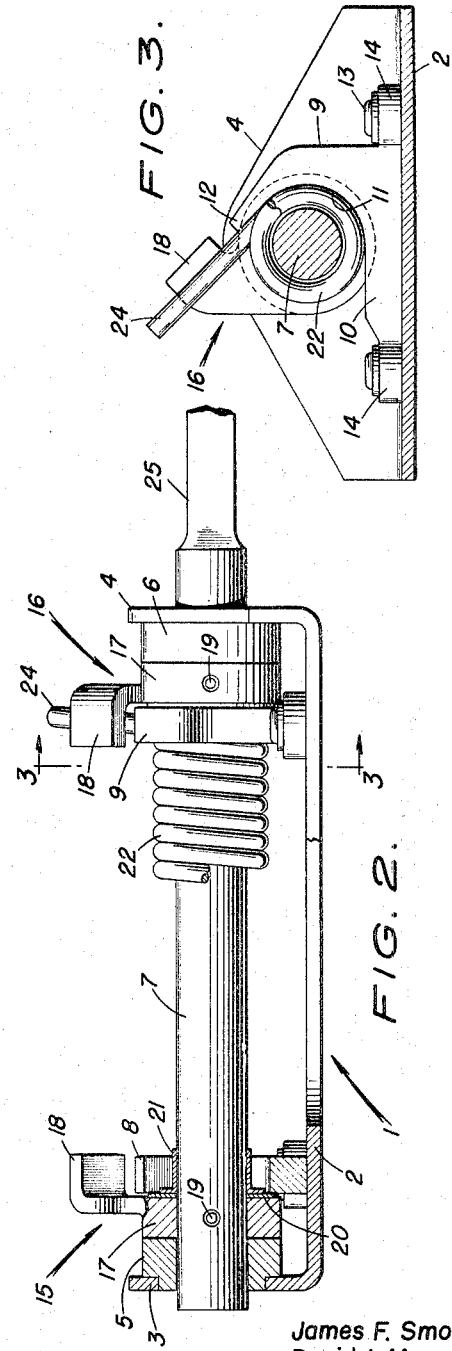
James F. Smola
David I. Moss
INVENTORS
BY
*Claude Funkhouser*
ATTORNEY James F. Smola
David I. Moss
INVENTORS

United States Patent Office 3,295,809
Patented Jan. 3, 1967

3,295,809
TORSION SPRING HINGE MECHANISM
James F. Smola and David I. Moss, Silver Spring, Md., assignors to the United States of America as represented by the Secretary of the Navy
Filed June 11, 1963, Ser. No. 287,159
5 Claims. (Cl. 248—204)

This invention relates generally to hinge assemblies for space vehicles, and more specifically to an improved torsion spring type hinge wherein the torsion spring is preloaded.

It is an object of this invention to provide a hinge for erecting a solar cell panel from a constrained position lying adjacent a wall of a satellite to an optimum pitch angle, the pitch angle being defined as the angle between the vertical axis of the satellite and the projection of the solar cell panel on a plane perpendicular to the longitudinal axis of said panel and containing the vertical axis of the satellite.

It is a further object of this invention to provide, in a hinge for space vehicles, means for compensating for overtravel of the solar cell panels in the erection process.

Still another object of this invention resides in the provision of means for damping the oscillatory motion of an extended solar cell panel.

The attendant advantages of this invention will be better appreciated and said invention will become clearly understood by reference to the following detailed description and accompanying drawings, wherein:

FIG. 1 is a top plan view of the torsion spring hinge mechanism and connecting elbow shaft;

FIG. 2 is a side elevation, partly in section, of the torsion spring hinge mechanism and connecting elbow shaft;

FIG. 3 is a transverse section, on line 3—3 of FIG. 2, showing one of the stationary spring retainers and one of the movable spring arms employed;

Figure 6:
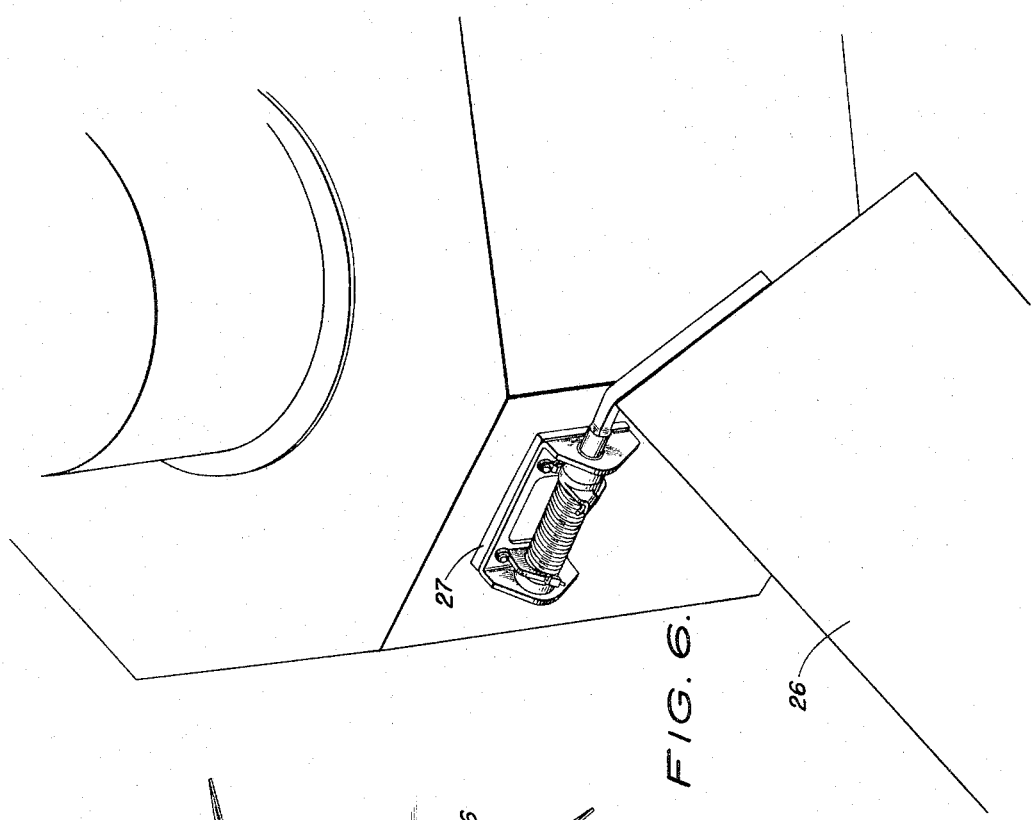
FIG. 6 is an enlarged perspective view of a satellite in orbit, and shows a close-up view of a hinge, with its associated elbow shaft and connected solar cell panel, in the erected position.

This invention is intended for use on a satellite of the type that employs solar cells for supplying some of its electric power. After the satellite has attained an orbit, four solar cell panels must each be erected to a proper pitch angle with respect to the satellite. A proper pitch angle is requisite to provide optimum exposure of the cells to the sun, so as to obtain maximum power and efficiency.

Prior to erection the solar cell panels assume positions in planes in close parallel relation to the sides of the satellite and adjacent the erection mechanisms. Erection of said panels to the necessary pitch angles is accomplished with only one motion of the new hinge assemblies. The aforesaid single motion is particularly attractive, because it eliminates the complexities of separate structures for erection and pitch. The invention is especially desirable in that it does not extend into the satellite's interior, thus facilitating assembly procedures, and is easily removed for servicing and transport with the solar cell panel.

Referring to the drawings in more detail, a base plate is shown at 1 and is provided with a flat bottom wall 2 and upstanding flanges 3 and 4 at its opposite ends. The flanges 3 and 4 are disposed perpendicular to the bottom wall 2 and are provided with centrally located aligned openings into which are press-fitted the reduced and shouldered end portions of journal bearings 5 and 6. As best seen in FIGS. 1 and 2, the journal bearings are secured to the inner faces of the flanges 3 and 4 and rotatably mount the opposite end portions of a cylindrical shaft 7, the purpose for which shaft will be set forth in more detail hereinafter.

Mounted on the bottom wall 2 of the base plate 1 are spring retainers 8 and 9. As best seen in FIG. 1, the retainers 8 and 9 are mounted in parallel spaced relation to the flanges 3 and 4 and are oppositely presented. Referring to FIG. 3, it is seen that each retainer includes a base portion 10 and an upwardly curved portion 11 that terminates in a straight tongue 12, and that each said retainer is positioned with its curved portion 11 partially surrounding the cylindrical shaft 7. Rivets 13, which extend through a pair of laterally projecting lugs 14 on the base portion 10 and through aligned holes in base plate 1, secure the spring retainers to said base plate.

A pair of spring actuator arms 15 and 16 are fixedly mounted on cylindrical shaft 7 in parallel spaced relation to the flanges 3 and 4 and are oppositely presented. As best seen in FIGS. 1 and 2, each spring actuator arm includes a cylindrical portion 17 and an inverted L-shaped portion 18, and has both an axial bore and a radial bore in its cylindrical portion. Each end portion of the cylindrical shaft 7 passes through the axial bore in one of said actuator arms, and the radial bores in the actuator arms are aligned with corresponding radial bores in said cylindrical shaft. As best seen in FIG. 2, the spring actuator arms 15 and 16 are secured to the cylindrical shaft 7 by means of rollpins 19, one rollpin being press-fitted to the radial bore in each said actuator arm and into the corresponding radial bore in cylindrical shaft 7, thereby enabling said actuator arm to rotate with cylindrical shaft 7.

Disposed about the cylindrical shaft are a pair of washers and a pair of sleeves, one said washer and sleeve, respectively, being shown at 20 and 21 in FIG. 2. The washers are each mounted at opposite ends of said cylindrical shaft adjacent the inner face of one of the spring actuator arms 15 or 16, and said sleeves are each mounted adjacent one of the washers.

As best shown in FIG. 1, a close-wound pre-loaded torsion spring 22 is disposed about cylindrical shaft 7, with end legs 23 and 24 constrained by the spring retainers 8 and 9, respectively.

Again referring to FIG. 2, an elbow-shaped rectangular solar cell panel support shaft 25 is shown attached, as by welding, to one end of cylindrical shaft 7. The angle of bend at the elbow is one hundred and forty degrees, to provide optimum exposure to the sun of solar cells mounted on a panel secured to the shaft 25.

Figures 4, 5:
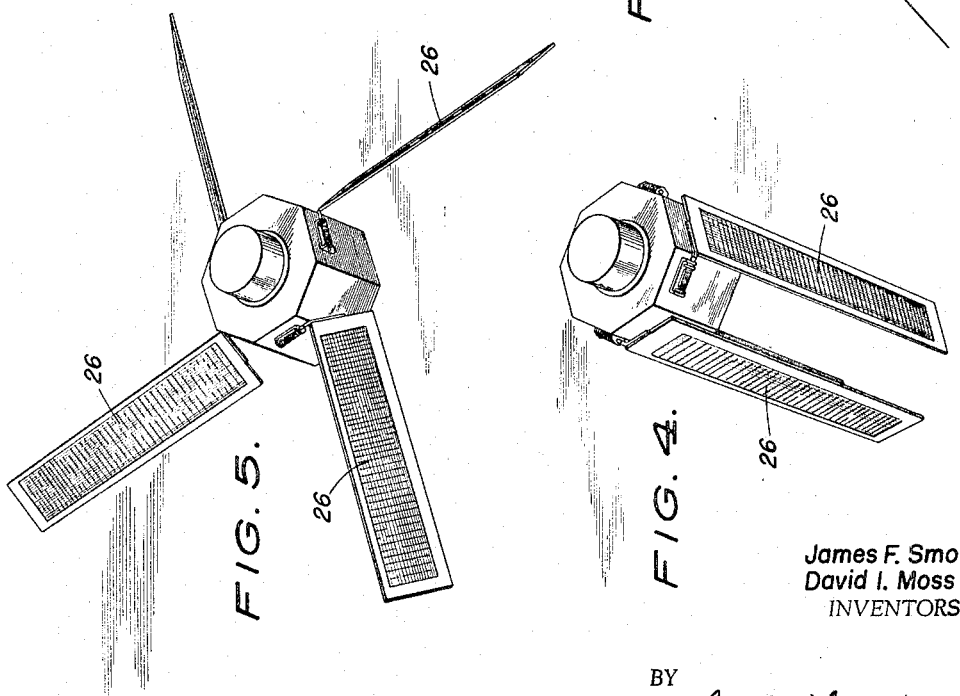
FIG. 4 is a perspective view of a satellite in orbit, the hinges with their associated elbow shafts and connected solar cell panels, being shown in the constrained position.
FIG. 5 is a perspective view of a satellite in orbit, the hinges with their associated elbow shafts and connected solar cell panels, being shown in the erected position.

Referring now to FIGS. 4, 5 and 6, the base plate 1 is secured to the side of the satellite so as to slope inward at an angle of five degrees (FIG. 6) from one end of said base plate to the opposite end, to which is attached the elbow-shaped solar cell panel support shaft 25. A solar cell panel 26 is secured to the shaft 25. One method of acquiring the five degree slope is to mount said base plate on a five degree wedge 27, the entire assembly then being secured, as by bolts, to the side of the satellite. It is clearly indicated in FIGS. 4 and 5 that in the constrained position the solar cell panel 26 is flush with the side of the satellite, and that in the open position the panel assumes a predetermined optimum pitch angle.

The torsion spring 22 is disposed about the cylindrical shaft 7, and its legs 23 and 24 are held fixed by the stationary spring retainers 8 and 9. In the aforementioned configuration the torsion spring 22 is preloaded, and because the movable spring actuator arms 15 and 16 also bear against the constrained spring legs 23 and 24, the solar cell panel 26 is kept from moving unless a moment greater than the spring preload moment is applied thereto.

With the solar cell panels folded in their launching configuration the spring legs are fixed between the stationary spring retainers 8 and 9 and the spring actuator arms 15 and 16. When a solar cell panel is released from its constrained launch configuration, by mechanism not shown, the spring transfers its stored energy to the solar cell panel 26 through one of the spring arms 15 or 16. Very simply, the spring arms alternately come to rest on the stationary spring retainers 8 and 9, and are alternately picked up by the spring arms 15 and 16, through the cylindrical shaft 7 and elbow-shaped shaft 25, as the solar cell panel oscillates back and forth.

Damping of the aforementioned oscillatory motion is primarily accomplished by means of friction between the coils of the close-wound torsion spring 22. When all the kinetic energy of the spring is dissipated the solar cell panel will come to rest and be held at the satellite's equator.

It can readily be seen that many variations and modifications of the present invention are possible in the light of the aforementioned teachings. It is therefore to be understood that within the scope of the appended claims the invention may be practiced in a manner otherwise than is specifically described herein.

What is claimed is:

1. A hinge for supporting a satellite solar cell panel, including, in combination with a satellite
   a base plate having a pair of aligned, spaced flanges projecting therefrom, said flanges having aligned, centrally located openings therein,
   a pair of journal bearing partially received within said centrally located openings,
   a cylindrical shaft having its opposite end portions received within said journal bearings,
   a pair of spaced stationary structurally independent spring retainers affixed to said base plate between said flanges,
   a preloaded torsion spring disposed about said cylindrical shaft between said retainers, the ends of said spring projecting tangentially to define oppositely directed legs,
   a pair of arms secured to said cylindrical shaft and in engagement with the legs of said spring,
   an elbow-shaped solar cell panel support shaft rigidly secured to one end of said cylindrical shaft, and
   a solar cell panel connected to said support shaft, said elbow-shaped shaft having an included angle at the elbow of such value, that when said support shaft is erected to be in a plane substantially normal to said base plate said panel is properly positioned in angular relationship to the satellite axes.

2. A hinge for supporting a satellite solar cell panel, comprising
   a base,
   a rockable shaft operatively mounted on said base,
   a preloaded spring operatively connected to said rockable shaft,
   an elbow-shaped support shaft secured to one end of said rockable shaft, and
   a solar cell panel connected to said support shaft, said support shaft being rockable into a plane substantially normal to said base by means of said preloaded spring, and said panel being properly positionable and maintainable in angular relationship to said base by said preloaded spring.

3. A hinge for supporting a satellite solar cell panel, comprising,
   a base,
   a rockable shaft operably mounted on said base,
   a preloaded spring disposed about said shaft, the ends of said spring defining two tangentially extending oppositely directed legs,
   an elbow shaped support shaft secured to one end of said rockable shaft,
   a solar cell panel secured to said support shaft and erectable by means of said preloaded spring into a desired angular relationship with said satellite axes, and
   a pair of structurally independent spring retainers so constructed and arranged that they engage the legs of said preloaded spring in opposed directions to preclude displacement of said solar cell panel from said desired angular relationship.

4. A hinge for supporting a satellite solar cell panel, comprising,
   a base,
   a rockable shaft operably mounted on said base,
   a preloaded spring operably disposed about said shaft, the ends of said spring defining two tangentially extended oppositely directed legs,
   an elbow shaped support shaft secured to one end of said rockable shaft,
   a solar cell panel secured to said support shaft and erectable by means of said preloaded spring into a desired angular relationship with said satellite axes, and
   a pair of structurally independent spring arms rigidly connected to said rockable shaft and alternately engaging the two legs of said preloaded spring, said spring having closely wound coils adapted to cause dampening of oscillatory motion of the solar cell panel.

5. A hinge for supporting a satellite solar cell panel, as set forth in claim 4, additionally including,
   a pair of structurally independent spring retainers so constructed and arranged that they engage the legs of said preloaded spring in opposed directions to preclude the displacement of said solar cell panel from said desired angular relationship, said spring retainers further serving to maintain the preloaded condition of said spring.

References Cited by the Examiner

UNITED STATES PATENTS

| | | | |
|---|---|---|---|
| 1,606,065 | 11/1926 | Eveleth | 248—292 X |
| 2,936,143 | 5/1960 | Anderson | 248—145 |

CLAUDE A. LE ROY, *Primary Examiner.*